Figure 1:
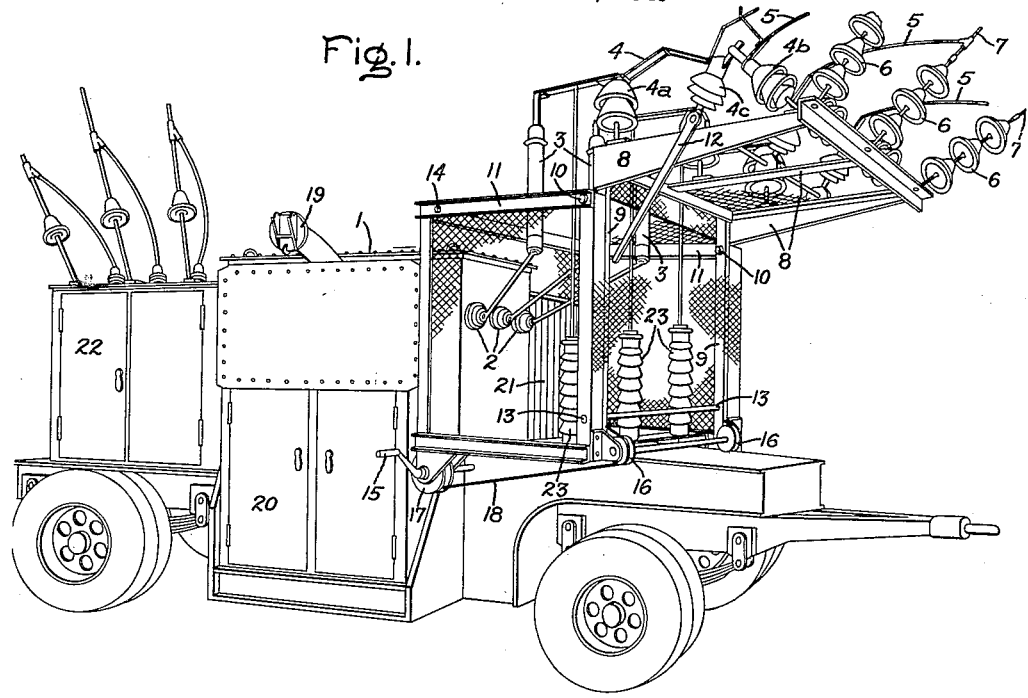

April 8, 1941.   E. V. DE BLIEUX   2,237,812
PORTABLE UNIT SUBSTATION
Filed Feb. 23, 1940

Inventor:
Earl V. De Blieux,
by Harry E. Dunham
His Attorney.

Patented Apr. 8, 1941

2,237,812

UNITED STATES PATENT OFFICE 2,237,812

PORTABLE UNIT SUBSTATION

Earl V. De Blieux, Pittsfield, Mass., assignor to General Electric Company, a corporation of New York Application February 23, 1940, Serial No. 320,232

7 Claims. (Cl. 175—298)

This invention relates to high-voltage, electric power transformer substations known as unit substations, and has for its general object the construction of such a unit substation which is quickly and easily convertible from a highly compact form for expeditious transportation into a fully insulated form for operation.

An electric transformer installation, taken together with its necessary auxiliaries, such as switchgear, their supporting and insulating framework and control apparatus is commonly called a substation. If these auxiliaries are mounted on or within the transformer casing as a unit, the apparatus is called a unit substation. Another object of the present invention is to make such a high-voltage unit power transformer substation portable.

A portable substation of any kind is generally intended for emergency service, as when failure of electric power in a locality shuts down elevators and machinery, plunges homes, offices and hospitals in darkness, ties up transportation and otherwise endangers public safety. It is very desirable that equipment for such emergency service be as complete and self-contained as possible; that is, be a unit substation; that it be light and readily convertible into a compact form, free from objectionable protruding parts, for fast transportation through traffic, under bridges, through tunnels and other similar limitations to transportation; that it be adapted to be put into service at the destination with maximum possible speed to relieve the emergency; and that, when put into service in such a public place as the emergency may demand, its construction affords adequate safety from electric shock to the operator and the public.

Even a slight familiarity with the appearance of a conventional transformer substation of only moderately high voltage, say 15,000 to 33,000 volts, will make clear how conflicting the foregoing requirements are, and that a portable power transformer substation may have to be a compromise. In fact, as far as I am aware, no truly portable unit substations of power transformers of such voltages have been built in the past. A common practice has been to transport the transformer and its auxiliary devices to their destination on a trailer as separate articles; there to jack up or otherwise erect the auxiliary structure; and then to make the necessary electrical connections between them and from them to the high voltage lines. This practice has not only been cumbersome and relatively slow but the form or forms which it has taken has been adapted to only limited degrees of freedom of adjustment, compromising either insulation distances in operation or compactness in transportation or safety to the public or a combination of them.

It is a further object of the present invention, therefore, to construct portable high-voltage unit substations which will satisfy all of the foregoing requirements simultaneously, without significantly compromising any, and to do so by a very simple and reliable structure.

In accordance with my invention, this result is accomplished by a cooperative combination of structural features which include constructing the equipment as a complete unit substation, with liberal insulation distances for safe operation; and making the framework supporting the high-voltage terminal equipment rotatable and of such a shape and so disposed that for transportation it can be conveniently swung into a compact inconspicuous position, in which no parts protrude above the transformer cover and the length of the substation is shortened; while at the destination said framework can be swung into its operating position to provide liberal insulation distances and be practically instantly ready for connection to the high-voltage lines to relieve the emergency. Furthermore, the parts are so arranged that for public safety all of the high potential parts of the substation, whether movable or stationary, can be permanently screened off against intrusion without interference with the movement of the movable parts or the erection and control of the substation.

The invention will be better understood from the following description taken in connection with the accompanying drawing and its scope will be pointed out in the appended claims.

Figure 2:
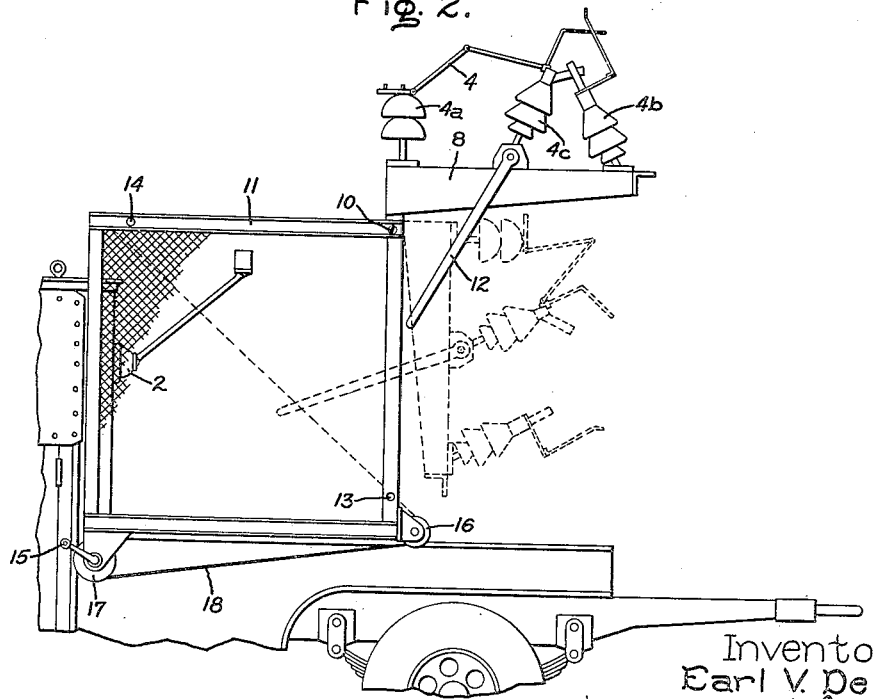

In the drawing, Fig. 1 shows a perspective view of a trailer-mounted portable three-phase high-voltage unit substation constructed in accordance with the present invention in a size suitable for voltages in the range of 15,000 to 33,000 volts and for power in the range of 500 to 2,000 kilovolt-amperes, and Fig. 2 is an enlarged side elevation of the high voltage terminal equipment in both its positions.

Referring now to the drawing, and particularly to Fig. 1, 1 is the cover of the casing enclosing the transformer proper which may be of any approved type, the details of which, however, do not form a part of the present invention. Three high-voltage bushings 2 are brought out horizontally through the side of the casing near the cover. The high-voltage terminal equipment comprises three removable high-voltage fuses, 3, one for each phase and of any approved type, suitable for the circuit current and voltage; three disconnecting switches, 4, one for each phase and of an approved type, shown here as comprising in each phase two fixed insulated members, 4a and 4b, and a movable member, 4c, operable by a handle 12; and a rotatable framework comprising horizontal members, 8, 8, 8, supporting the disconnecting switches, and vertical members, 9, 9, pivoted at 10, 10 to a stationary framework, 11, attached to the transformer casing. Fig. 1 shows the high-voltage terminal equipment in its operating position in which it is secured by pinning the rotatable framework to the stationary framework at 13. For transportation, the disconnecting switches are opened, fuses, 3, are removed, the rotatable framework is unpinned at 13 and allowed to rotate under its own weight around axis 10—10, making members 8, 8, 8, project downward and members 9, 9 project horizontally towards the transformer as shown in dotted lines in Fig. 2. The equipment may then be secured in this shipping position by pinning 9, 9 at 14. After being unpinned at 14, the equipment is rotated into operating position by means of a winch mechanism shown as a crank 15, pulleys 16 and 17, and cable 18. Wires 5 and 7 connect the disconnecting switches to the high tension lines (not shown) and insulators 6, 6, 6, permit anchoring the wires 7 and take up the strain from the disconnecting switches. Parts 5, 6, and 7 are not integral parts of the portable substation; they are shown here to illustrate the method of connecting up the equipment for service.

As a safety measure, metal screens are installed on the under side of parts 8, 8, 8, and integral therewith; in front of parts 9, 9 and free from them but attached to the stationary framework; on the sides of the stationary framework 11, 11 and at the bottom of said framework. It will be seen that this arrangement of screening prevents any person from reaching the high potential parts of the substation from below, and that this protection does not interfere with the freedom of rotation of the movable parts, neither does it add to the length or width of the substation in either its operating or shipping positions.

The axis of rotation 14 is located at the highest level of the transformer, in the present case the pressure relief pipe 19, so as to accommodate maximum possible length of members 8 in their vertical position for transportation.

Part 20 encloses load ratio control equipment of any approved type, no detail of which, however, is a part of the present invention. Part 21, on the opposite side of the transformer, is a bank of radiator tubes as conventionally used on transformer casings. Parts 20 and 21 roughly balance each other's weight and bulk both for compactness and for stability in fast transportation. Part 22 contains the low-voltage terminal equipment such as fuses or circuit breakers, terminal boards, etc. details of which, however, do not form a part of the present invention and are not shown. The high-voltage and the low-voltage terminal equipment are mounted on opposite sides of the transformer, lengthwise of the substation, balancing each other, and permitting the width of the transformer to be a minimum.

While parts 3, 3, 3 are shown and described as fuses for the double purpose of over-current protection and for breaking of connection between bushings and disconnecting switch to permit rotation of the latter, they may be replaced, if desired, by any other suitable circuit-opening means, preferably of an air-break type, for instance a simple knife switch, a removable link, etc.

The higher voltage substations are preferably provided also with over-voltage protection, such as lightning arresters, shown as parts 23 in the accompanying drawing. While, so far as physical support and normal operating conditions are concerned, the over-voltage protective means may be mounted on either the movable or the stationary part of the substation, and connected at any one of a plurality of points on the high-voltage circuit, yet the present invention provides a position for it adapted to more expeditious handling of the equipment and a zone of connections which assures protection under circumstances under which other schemes of connection would not. To assure the first-mentioned objective, the arresters are mounted on a non-rotating portion of the substation, preferably on the stationary framework which supports the pivoted equipment and inside the protective screens attached to that framework. To assure the second mentioned objective, the arresters are connected between the grounded portions of the substation and the high-voltage circuit in the zones between the high-voltage bushings and the disconnecting switches, and if high-voltage fuses are provided, in the zones between the fuses and the disconnecting switches. With this arrangement, at least three important advantages are secured: (a) there is no chance of the fuses being blown (or equivalent circuit breakers being tripped) by the discharge currents of the lightning arresters coming from the high-voltage lines; (b) if the disconnecting switch is open and disturbances are created in the transformer from the low-voltage side, the lightning arresters are still in service to discharge the voltages stepped up into the high-voltage winding, and while this will flow through the fuses (or equivalent circuit breakers), the current associated with discharges originating in this manner will be small and less likely to blow the fuses (or trip the circuit breakers); and (c) the lightning arresters may be serviced by opening the disconnecting switches.

While I have shown and described a particular embodiment of my invention, it will be obvious to those skilled in the art that changes and modifications can be made therein without departing from my invention, and I therefore aim in the appended claims to cover all such changes and modifications as fall within the true spirit and scope of my invention.

What I claim as new and desire to secure by Letters Patent of the United States, is:

1. In an electric system, a portable high-voltage unit substation comprising in combination a high-voltage transformer, high-voltage terminal equipment adapted to be interposed between said transformer and said system, and a framework supporting said equipment and adjustably mounted on said transformer to afford said equipment an elevated and lengthwise extended operating position with liberal insulation distances and convenient for connection to said system, and a retracted shipping position substantially reducing the height and the length of said substation for shipment.

2. A portable high-voltage unit substation comprising a high-voltage transformer including a casing, high-voltage terminal equipment, and a framework supporting said equipment, said framework being mounted on said casing and made rotatable into an operating and a shipping position around a horizontal axis located substantially at the upper level of said transformer, said operating position of said framework and terminal equipment extending substantially above said level and forwardly of said transformer, and said shipping position extending below said level and downwardly, reducing thereby substantially the height and the length of said substation for shipment.

3. A portable high-voltage unit substation comprising a high-voltage transformer enclosed in a casing and having a high-voltage bushing extending outwardly through one side of said casing and having terminal fittings adapted to removably engage one end of a high-voltage fuse; high voltage terminal equipment including a fuse and a disconnecting switch; a conducting framework supporting said disconnecting switch and having a fitting adapted to removably engage the remaining end of said high-voltage fuse in series relationship with said disconnecting switch; said framework being mounted on said casing, on the same side as said bushings and rotatable around a horizontal axis located near the upper level of said transformer, and having an operating position in which said terminal equipment is elevated above the level of said transformer and extending also horizontally away from said casing, and in which position also said fuse is engaged simultaneously by the fittings on said bushing and on said frame at opposite ends thereof; said equipment and supporting framework having also a traveling position in which connection between said disconnecting switch and said bushing is broken by removal of said fuse, and said disconnecting switch equipment and supporting framework are lowered below the level of said transformer and their extension away from said casing is substantially reduced.

4. A portable high-voltage unit substation comprising a transformer including a casing, a low-voltage lead brought out through one side of said casing, and a high-voltage lead brought out through opposite side of said casing; low-voltage terminal equipment associated with said low-voltage lead and mounted on said casing, on the same side with said low-voltage leads; high-voltage terminal equipment associated with said high-voltage lead and mounted on said casing on the opposite side from said low-voltage terminal equipment; voltage regulating equipment mounted on said casing on one of its remaining sides; and means adapted to dissipate the heat generated in said transformer mounted on said casing on the side opposite to said voltage regulating equipment; said high-voltage terminal equipment being rotatable into an operating position extending both above the upper level of said transformer and horizontally away therefrom and into a shipping position below said level and closer to said transformer; winch mechanism mounted on said casing and adapted to move said rotatable structure into a desired position; means to secure said structure in a desired position; a high-voltage fuse removably engaging said high-voltage lead at one end and said high-voltage terminal equipment at its other end, placing said lead and said equipment in series electrical relationship, when said equipment is in operating position.

5. A portable high-voltage unit substation comprising a high-voltage transformer, including a casing and a high-voltage bushing extending outwardly through one side of said casing; high-voltage terminal equipment supported on an arm of a frame having a second arm extending approximately at right angles to said first mentioned arm, said frame being mounted on said casing on the same side as said bushing and passing through said frame near the intersection of said two arms, said frame having an operating position in which said arm supporting said equipment extends principally horizontally away from said casing and said other arm extends downward, said frame having also a shipping position in which said arm supporting said equipment extends principally downwardly, and said second arm extends towards said casing; and protective means against electric shock, including screens arranged within the minimum dimensions of said substation exclusive of said screens.

6. A portable high-voltage unit substation comprising a high-voltage transformer including a casing and a high-voltage bushing extending outwardly through one side of said casing; a disconnecting switch mounted on a frame pivoted to said casing so as to provide an operating and a shipping position, and adapted to be electrically connected in series with said bushing in said operating position; and a lightning arrester mounted fixedly with reference to said casing and connected electrically between a grounded part of said substation and a point of the high-voltage system between said bushing and said disconnecting switch.

7. A portable high-voltage unit substation comprising a high-voltage transformer including a casing and a high-voltage bushing extending outwardly through said casing; a disconnecting switch pivotally mounted on said casing and having an extended and raised operating position and a retracted and lowered shipping position; removable vertically-extending high-voltage fuse means adapted to connect said bushing to said disconnecting switch in series relationship in said operating position of said switch and to be removed so as to lower the height of said substation when said switch is in its shipping position; and a lightning arrester mounted fixedly with reference to said casing and connected electrically between a grounded portion of said substation and a point of the high-voltage system between said fuse and said disconnecting switch.

EARL V. DE BLIEUX.